(12) United States Patent
Bhatt et al.

(10) Patent No.: US 10,728,264 B2
(45) Date of Patent: Jul. 28, 2020

(54) CHARACTERIZING BEHAVIOR ANOMALY ANALYSIS PERFORMANCE BASED ON THREAT INTELLIGENCE

(71) Applicant: HEWLETT PACKARD ENTERPRISE DEVELOPMENT LP, Houston, TX (US)

(72) Inventors: Sandeep N. Bhatt, Madison, NY (US); Pratyusa K. Manadhata, Piscataway, NJ (US); Tomas Sander, New York, NY (US)

(73) Assignee: Micro Focus LLC, Santa Clara, CA (US)

( * ) Notice: Subject to any disclaimer, the term of this patent is extended or adjusted under 35 U.S.C. 154(b) by 405 days.

(21) Appl. No.: 15/433,136

(22) Filed: Feb. 15, 2017

(65) Prior Publication Data

US 2018/0234445 A1 Aug. 16, 2018

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01); *H04L 63/1433* (2013.01)

(58) Field of Classification Search
None
See application file for complete search history.

(56) References Cited

U.S. PATENT DOCUMENTS

| 9,258,321 | B2 | 2/2016 | Amsler et al. | |
| 9,306,965 | B1* | 4/2016 | Grossman | H04L 63/1416 |
| 2014/0283047 | A1* | 9/2014 | Dixit | G06F 21/55 726/23 |
| 2015/0373043 | A1* | 12/2015 | Wang | G06F 21/552 706/12 |
| 2016/0057159 | A1* | 2/2016 | Yin | H04L 63/145 726/23 |
| 2016/0294773 | A1* | 10/2016 | Yu | H04L 63/1425 |
| 2016/0308898 | A1 | 10/2016 | Teeple et al. | |
| 2016/0308910 | A1* | 10/2016 | Carver | H04L 63/1441 |

FOREIGN PATENT DOCUMENTS

| WO | WO-2015/200308 A1 | 12/2015 |
| WO | WO-2016/025081 A1 | 2/2016 |

OTHER PUBLICATIONS

"Pervasive Visibility, Effective Security, Performance Insight," 2016, pp. 1-4, Click Networks.

* cited by examiner

*Primary Examiner* — Henry Tsang

(57) ABSTRACT

A technique includes receiving data identifying behavior anomalies that are exhibited by entities that are associated with a computer system. The technique includes associating the behavior anomalies with contexts based at least in part on threat intelligence to provide modified anomalies. The threat intelligence associates the contexts with indicators of potential breach. The technique includes characterizing the behavior anomaly identification based at least in part on the threat intelligence. The characterization includes applying machine learning to features of the modified anomalies to classify the identified behavior anomalies.

20 Claims, 5 Drawing Sheets

CHARACTERIZING BEHAVIOR ANOMALY ANALYSIS PERFORMANCE BASED ON THREAT INTELLIGENCE

BACKGROUND

An enterprise may employ a system of software and services, called a "security information and event management (SIEM) system," for purposes of detecting and responding to security events that occur with the enterprise's computer system. In this manner, the SIEM system may monitor operations of the computer system (logon failures, communications with blacklisted domains, and so forth) for purposes of generating corresponding security alerts. A security operations center (SOC) of the enterprise may include a relatively large staff for purposes of addressing the security alerts. In this manner, analysts at the SOC may investigate the security alerts by manually gathering information about the users and devices that are mentioned in the alerts for such purposes as identifying alerts of concern and determining the appropriate remediation actions for these identified alerts.

DETAILED DESCRIPTION

Figure 1:
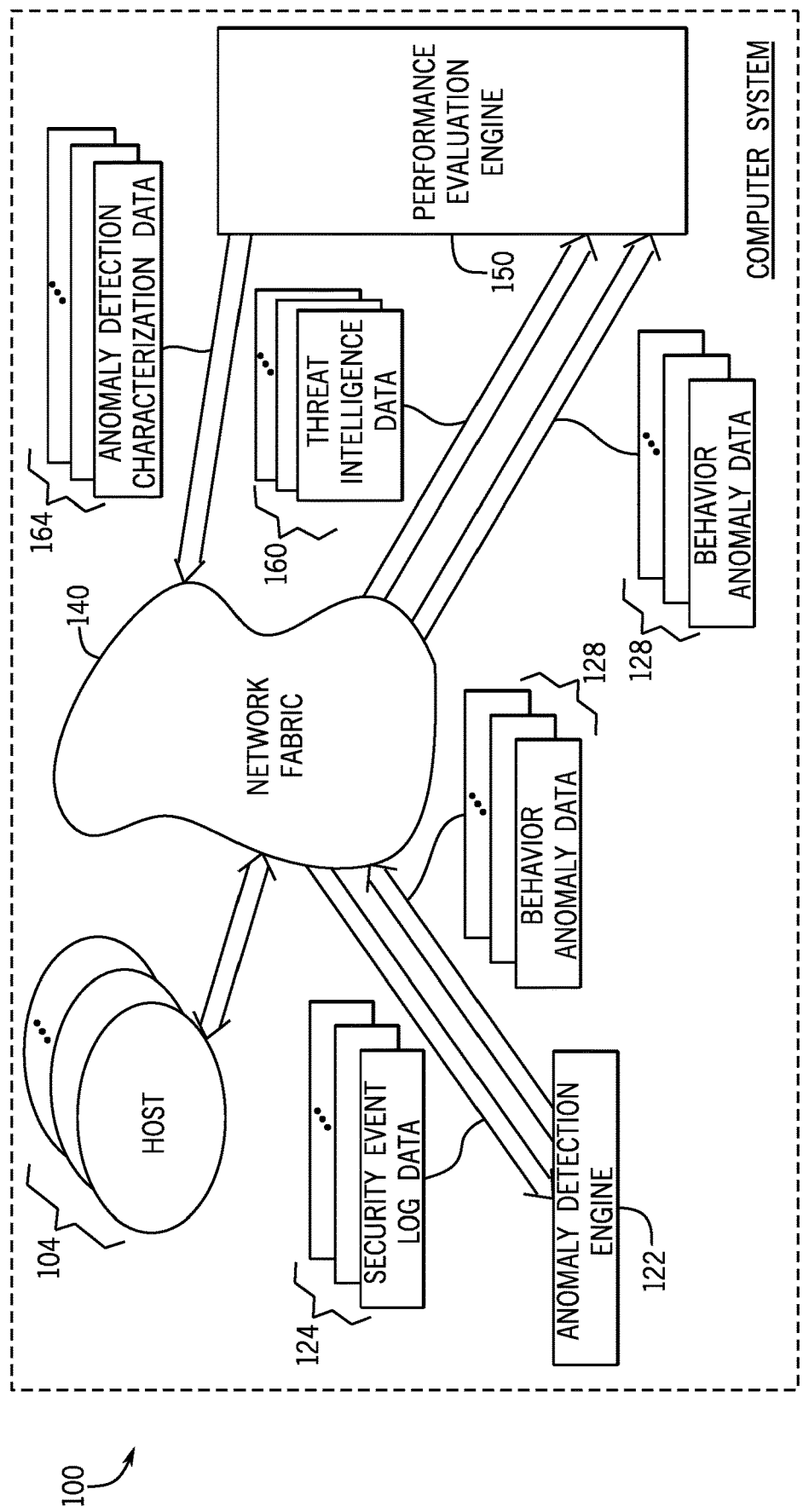
FIG. 1 is a schematic diagram of a computer system according to an example implementation.

An enterprise may employ a security information and event management (SIEM) system for purposes of applying one or multiple algorithms to detect and report behavior anomalies to a security operations center (SOC). In this manner, analysts of the SOC may respond to the reported anomalies for purposes of identifying security threats and taking action to manage these threats. In accordance with example systems and techniques that are described herein, the SIEM system may identify behavior anomalies that are exhibited by entities that are associated with the computer system. In this context, an "entity" refers to a thing that exists by itself and has one or multiple characteristics. As examples, an entity may be a human, such as a user of a computer or computer system; an electronic device, such as a computer, a phone or network switch; an address associated with an electronic device or resource, such as an Internet Protocol (IP) address, a domain name or a uniform resource locator (URL); and so forth.

A "behavior anomaly" (also referred to as an "anomaly" herein) refers to a behavior that is an outlier (either statistically or otherwise), with respect to a baseline behavior. As examples, the baseline behavior for a given entity may be a particular historic behavior that is associated with the entity. For example, for the case in which an entity is a computer, a historic average rate of outgoing data that is communicated by the computer may be considered a baseline behavior. The baseline behavior may be a behavior that is determined from other peers. For example, for the case in which an entity is a user, the logon failure rates by other users of the same work group, for example, may be considered to be a baseline behavior. For the case in which an entity is a computer, the outgoing data rates by computers of the same work group may be considered to be a baseline behavior, and as another example for the case in which an entity is a computer, a baseline behavior may be the number of communications with blacklisted domains (i.e., known malicious domains) by computers that are associated with the same project.

A wide range of behaviors may be monitored or observed (through logged security event data, for example) for purposes of identifying behavior anomalies. Examples of behavior anomalies may be a relatively high number of failed logins, a relatively high number of domain name system (DNS) queries, a relatively high number of Hypertext Transfer Protocol (HTTP) queries to blacklisted websites, a relatively high number of outgoing data bytes, and so forth.

It may be beneficial to describe or characterize the behavior and effectiveness of the anomaly detection procedures, or algorithms, used by a given enterprise for several reasons. These anomaly detection algorithms may be used by a security analytics module, or engine, that may be associated with, for example, a particular software program or suite of software programs. As an example, the designers of the anomaly detection algorithms may use such characterization to understand the type of security threats that the anomaly detection algorithms detect, the associated false positive rate (i.e., the rate at which the anomaly detection algorithms wrongly identify behavior anomalies), the associated false negative rate (i.e., the rate at which the anomaly detection algorithms fail to identify behavior anomalies), and so forth. This feedback may thus be beneficial for improving the behavior anomaly detection algorithms. As another example, a given organization may use the characterization to judge the effectiveness and relevance of its anomaly detection algorithms for the organization's specific environment for purposes of deciding which security analytics software to discontinue, replace, upgrade or expand. Moreover, such characterization may be used to identify where (i.e., identify systems, datacenters, workgroups, and so forth) certain security analytics software is to be deployed. As another example, a vendor marketing security analytics software may use such characterization for purposes of differentiating the solutions that are provided by the software from the solutions that are provided by software sold by competitors. Also, the characterization may allow an end user (e.g., a security analyst) to better understand what certain security analytics software achieves (e.g., understand what certain security alerts mean).

In general, judging the effectiveness and behavior of a given behavior anomaly detection algorithm may be a relatively challenging task due to the lack of a ground truth, i.e., a reference against which the effectiveness and/or behavior of the algorithm may be compared. For example, if a given anomaly detection algorithm reports an anomaly in a machine's network behavior, which suggests that the machine is infected with or comprised by malware (a worm, a virus, a Trojan horse, spyware, and so forth), it may be relatively difficult to determine whether this assessment is true due to the lack of a ground truth. As another example, if a security intrusion is detected by an anomaly detection algorithm, it may be difficult to distinguish a relatively high impact cyber intrusion, which is important from the standpoint of security analysis, from commodity malware, which is less important from the standpoint of security analysis. As another example, an anomaly detection algorithm may indicate that a given machine is being attacked by reporting a set of behavior anomalies. However, the reported anomalies may not identify which type of attack is occurring. Thus, the challenges in judging the effectiveness and/or behavior of a given anomaly detection algorithm arise from difficulties related to judging the individual identified behavior anomalies, as well as the difficulties related to judging the overall behavior of the anomaly detection.

Systems and techniques are described herein for purposes of describing the effectiveness and/or behavior of a behavior anomaly detection engine based at least in part on threat intelligence. In this context, the "behavior anomaly detection engine" (or "anomaly detection engine) is formed from at least part of an actual, physical machine or at least part of multiple physical machines, which employ one or multiple behavior anomaly detection algorithms. As an example, the physical machine may include a hardware processor (one or multiple central processing units (CPUs), one or multiple CPU cores, and so forth) that executes machine executable instructions (or "software") that cause the processor to apply one or multiple behavior anomaly detection algorithms for purposes of identifying and reporting behavior anomalies that are associated with a computer system.

In general, "threat intelligence" refers to evidence-based knowledge about observed security threats that may affect a given computer system. In accordance with example implementations, the threat intelligence may be provided by a service and contain data in a standardized format, which describes observables (events, states, pattern of network communications, and so forth) that are associated with specific contexts. In this manner, the threat intelligence may describe indicators of potential breach, such as Indicators of Compromise (IOCs), for example. In general, indicators of potential breach, such as the IOCs, are observables that are associated with known, or reputed, malicious activity. As a more specific example, the threat intelligence may identify IOCs, and the threat intelligence may associate a given IOC with such context as the IOC being related to a known, or reputed, Command & Control (C&C) server; the IOC being related to a malware distribution or malware family; the IOC being related to a particular kill chain stage; the IOC being related to a particular type of campaign (a phishing campaign, a credit card theft, an intellectual property theft and so forth); the IOC being related to a recognized threat actor; the IOC being associated with a particular set of tools, techniques and procedures (TTPs) (i.e., a description of the software tools and methods that a threat actor is using); and so forth. Scores for impact and confidence are other examples of context that the threat intelligence may associate with the IOCs.

In accordance with example implementations, the threat intelligence may be communicated using data that is arranged in or associated with a structured machine-readable format, such as a format defined by the Structured Threat Information eXpression (STIX) specification, the Cyber Observable Expression (CybOX) specification or the Trusted Automated Exchange of Indicator Information (TAXII) specification, as well as other formats that are defined by other specifications.

In accordance with example implementations that are described herein, behavior anomalies that are identified by a given behavior anomaly detection engine are associated with context based at least in part on threat intelligence to provide modified anomalies. In this manner, the "modified anomalies" refer to the identified behavior anomalies that have been associated with (enhanced by, enriched by, amplified by, and so forth) context that is provided by the threat intelligence. As examples, behavior anomalies that are detected by the security analysis engine may be associated with such observables as IP addresses, domain names, URLs, email addresses, file hashes, mutexes, autonomous system numbers (ASNs), and so forth, to form corresponding modified behavior anomalies.

As a more specific example, a given behavior anomaly may be associated with a set of anomalous DNS queries that are submitted by a machine and the corresponding responses due to these queries. From these queries and responses, a set of domain names queried and the IP addresses to which these queries resolved may be extracted. Using threat intelligence, a set of domain names and IP addresses may be associated with specific context to form modified behavior anomalies. The modified behavior anomalies may include, for example, names that are associated with known malicious domains or IP addresses; specific attacks associated with these domains and/or IP addresses; HTTP addresses associated with the domains and/or IP addresses; and so forth.

Moreover, as described herein, in accordance with example implementations, machine learning may be applied to features of the enriched behavior anomalies for purposes of characterizing the behavior anomalies and characterizing the behavior and/or performance of the anomaly detection engine.

As a more specific example, FIG. 1 depicts a computer system 100 in accordance with some implementations. In general, the computer system 100 includes one or multiple hosts 104, which, in general may be processor-based electronic devices, such as computers, tablet computers, thin clients, clients, servers, desktop computers, notebook computers, smartphones, and so forth. In general, a given host 104 may be associated with one or multiple entities, such as one or multiple users, IP addresses, one or multiple other hosts 104, and so forth. Certain hosts 104 may be associated with certain data centers of the computer system 100, certain workgroups, certain projects, and so forth. Moreover, users of the hosts 104 may be associated with certain projects, workgroups, data centers, and so forth.

In general, the hosts 104 may communicate with each other and communicate with devices inside and outside of the computer system 100 via network fabric 140. In general, the network fabric 140 may be a private network fabric, a public network fabric, a combination of public and private network fabrics, and so forth. It is noted that various implementations of the computer system 100 are contemplated. For example, the computer system 100 may be disposed at a single geographical location; may be distributed at several geographical locations; may be located partially or entirely within a public, private or hybrid cloud; and so forth.

The computer system 100 may include an anomaly detection engine 122, which analyzes logged, or collected, security event data 170 for purposes of generating behavior anomaly data 128 that identifies anomalous behaviors that are exhibited by the entities that are associated with the computer system 100. As examples, the entities may include users, electronic devices (computers, and so forth), internet protocol (IP) addresses, domain names, uniform resource locators (URLs), and so forth. In accordance with example implementations, the anomaly detection engine 122 may perform security analytics on collected event data. The network data sources that are analyzed to produce the security event data 170 may include, as examples, hypertext protocol (HTTP) logs, domain name service (DNS) logs, virtual private network (VPN) logs, netflow traffic, intrusion detection system (IDS) logs, and so forth. In accordance with example implementations, the security event data may be derived from system devices. In accordance with example implementations, the security event data may be derived from system logs or from an endpoint management tool.

The anomaly detection engine 122, in accordance with example implementations, determines baseline behaviors for the computer system 100, and then, using the baseline behaviors, the anomaly detection engine 122 looks for deviations from the baseline behaviors to detect or identify behavior anomalies. In general, behavior anomalies may include, for example, a relatively high number of failed logins, a relatively high number of DNS queries, a relatively high number of HTTP queries to blacklisted websites, a relatively high number of outgoing bytes, and so forth. In general, the baseline behaviors may be determined from analyzing the historic behaviors of entities, observing behaviors of peers related to a given entity, and so forth. Depending on the particular implementation, the anomaly detection engine 122 may employ such tactics as time series analysis, statistical comparisons, graph analytics, and so forth, for purposes of determining baseline behaviors and identifying behavior anomalies.

In accordance with example implementations, a performance evaluation engine 150 of the computer system 100 processes the behavior anomaly data 128 that is provided by the anomaly detection engine 122 and threat intelligence data 160 for purposes of generating anomaly detection characterization data 164. In particular, in accordance with some implementations, the performance evaluation engine 150 performs a technique 200 that is depicted in FIG. 2.

Figure 2:
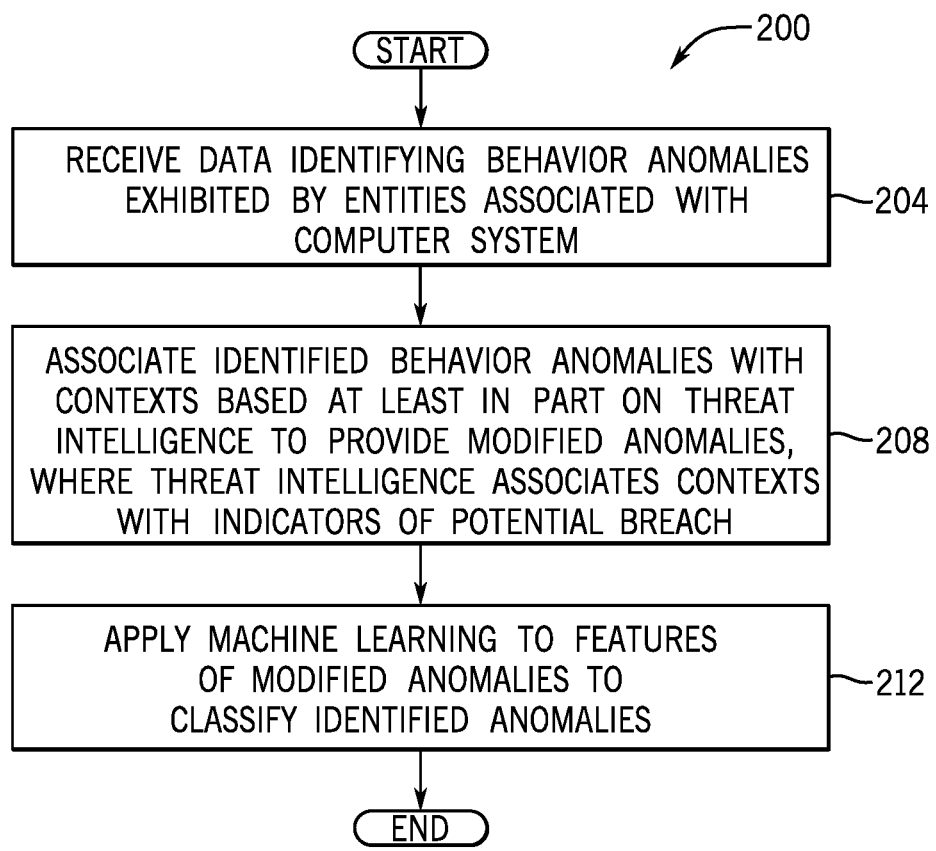
FIGS. 2 and 4 are flow diagrams depicting techniques to characterize behavior anomaly analysis performance using threat intelligence according to example implementations.

Referring to FIG. 2 in conjunction with FIG. 1, the technique 200 includes receiving (block 204) data identifying behavior anomalies that are exhibited by entities associated with a computer system and associating (block 208) the identified behavior anomalies with contexts based at least in part on threat intelligence to provide modified anomalies. The threat intelligence associates the contexts with indicators of compromise. The technique 200 includes applying (block 212) machine learning to features of the modified anomalies to classify the identified behavior anomalies.

As a more specific example, in accordance with some implementations, the performance evaluation engine 150 may apply clustering (i.e., machine learning based clustering that relies on a clustering model, a connectivity model, a centroid model, a distribution model, a density model, a graph-based model, a group model, and so forth) to identify the most common feature combinations of the modified behavior anomalies. For example, the anomaly detection characterization data 164 (indicating the results of the clustering for this example) may represent that a given percentage of the behavior anomalies that are detected by the anomaly detection engine 122 are true positives, which are associated with ransomware (a specific feature combination under consideration).

Referring back to FIG. 1, in accordance with some implementations, the performance evaluation engine 150 cross-correlates the IOCs contained in the threat intelligence data 160 with a particular feature combination under consideration (ransomware, for example) for purposes of identifying false negatives. In this manner, a "false negative" refers to a behavior anomaly that is not identified by the anomaly detection engine 122. Therefore, by cross-correlating the IOCs with the security event log data 124 for a given feature combination, the performance evaluation engine 150 may identify behaviors, which were not marked as being anomalous by the anomaly detection engine 122.

Continuing the example regarding the ransomware feature combination, the false negative analysis may, for example, reveal a number of incidents of ransomware infections that were missed by the anomaly detection engine 122. For example, the result of this analysis by the performance evaluation engine 150 may reveal that ten percent of ransomware incidents (according to the threat intelligence), were missed by the anomaly detection engine 122.

Figure 3:
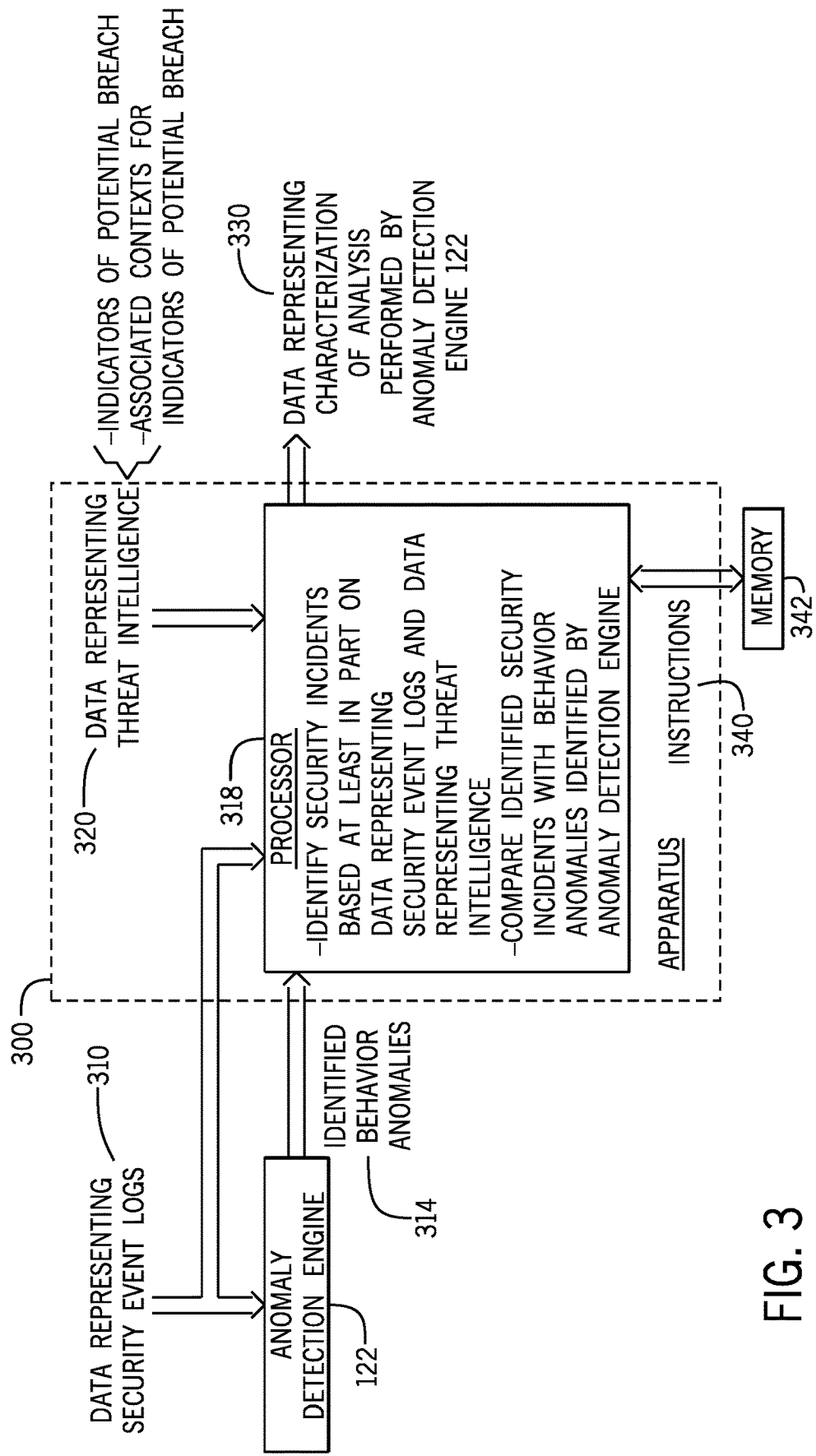
FIG. 3 is a schematic diagram of an apparatus to identify a characteristic associated with behavior anomaly analysis according to an example implementation.

Thus, referring to FIG. 3 in conjunction with FIG. 1, in accordance with some implementations, an apparatus 300 may be used for purposes of determining a characteristic that is associated with behavior anomaly detection. In particular, the apparatus 300 may include a processor 318 (one or multiple CPUs, one or multiple CPU cores, and so forth) and a memory 342. The memory 342 stores instructions 340 that, when executed by the processor 318, cause the processor 318 to identify security incidents based at least in part on data 310 that represents security event logs and data 320 that represents a threat intelligence. The threat intelligence represents indicators of potential breach and associated contexts for the indicators. The instructions 340 when executed by the processor 318 cause the processor 318 to compare the identified security incidents with behavior anomalies that are identified by the anomaly detection engine 122 and provide data 330 that represents a characteristic of the anomaly analysis by the anomaly detection engine 122.

Due to the above-described common feature identification and false negative determination, in accordance with example implementations, the results obtained by the performance evaluation engine 150 may be used to make relatively precise statements about the behavior of the anomaly detection engine 122. For example, the result may reveal that the anomaly detection engine 122 detects more than ninety percent of ransomware incidents in an organization, and the results may reveal that the large majority of behavior anomalies that are identified by the algorithm (eighty percent, or more, for example) are ransomware related.

In accordance with example implementations, the above-described quantitative evaluation of the anomaly detection engine 122 is relative to the threat intelligence sources that are used as well as the particular snapshot of event data that were processed. To generalize, the quantitative evaluation may be repeated by the performance evaluation engine 150 over a number of successive time windows. Moreover, in accordance with some implementations, the performance evaluation engine 150 may average the results obtained in the successive time windows. Additionally, in accordance with some implementations, the event logs from different organizations (i.e., logs in which the same anomaly detection engine 122 is used) may be used. Moreover, in accordance with some implementations, the performance evaluation engine 150 may apply the above-described methodology to different threat intelligence sources and average these results. Thus, in general, characterizing the behavior anomaly detection may include averaging at least one of the following: security event log data; event data corresponding to different time windows; event data collected from different organizations; or threat intelligence associated with multiple threat intelligence sources. This averaging may improve the generality of the characterization, in accordance with example implementations.

In accordance with example implementations, the plausibility of the results that are obtained by the performance evaluation engine 150 depends on the quality and appropriateness of the threat intelligence source or sources that are used. Therefore, in accordance with some implementations, the identities of the threat intelligence sources are disclosed for purposes of aiding the anomaly detection evaluation claim.

The level of detail that is selected for characterizing the behavior anomaly detection may be selected according to the purpose at hand. In this manner, the team designing the procedure used by the anomaly detection engine 122 may select a relatively high level of precision for the performance evaluation engine 150 in the feature combinations so that the team may systematically improve the algorithm(s) that are used by the engine 122. For marketing purposes, more generic categories may be appropriate.

The techniques and systems that are disclosed herein expose the limitations or weaknesses of anomaly detection procedures. For example, a given vendor may claim that the vendor has a relatively powerful signature-less procedure for detecting malware infections, whereas the result obtained by the performance evaluation engine 150 may reveal, for example, that the product by the vendor is detecting a relatively small set of malware families (such as the Zeus family, for example), suggesting that the anomaly detection is more similar to a signature-based technique. As such, the results obtained by the performance evaluation engine 150 may be a relatively powerful tool for negative marketing (i.e., marketing as to the deficiencies of competitors), as well.

In accordance with further example implementations, for cases in which there is a relatively high confidence in the output of the anomaly detection engine 122, the approaches that are used herein are used to evaluate the quality of the threat intelligence. In this regard, the data 330 (FIG. 3) provided by the apparatus 300 may, for example, represent a characterization of the reliability or veracity of the threat intelligence feed, in accordance with further example implementations.

Figure 4:
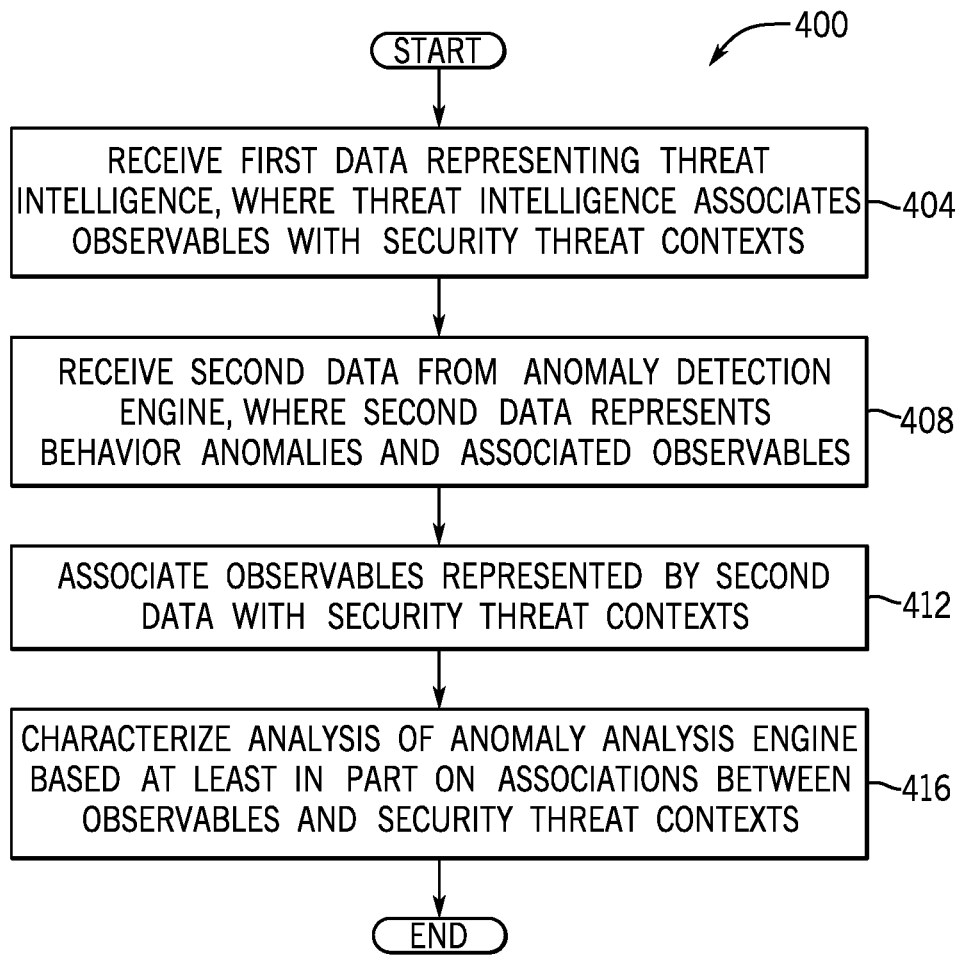

Thus, to summarize, in accordance with example implementations, a technique 400 that is depicted in FIG. 4 includes receiving (block 404) first data, which represents threat intelligence, where the threat intelligence associates observables with security threat contexts. The technique 400 includes receiving (block 408) second data from an anomaly detection engine, where the second data represents behavior anomalies and associated observables. The observables that are represented by the second data are associated (block 412) with the security threat contexts; and analysis of the anomaly detection engine may be characterized, pursuant to block 416, based at least in part on the associations between the observables and the security threat contexts.

Figure 5:
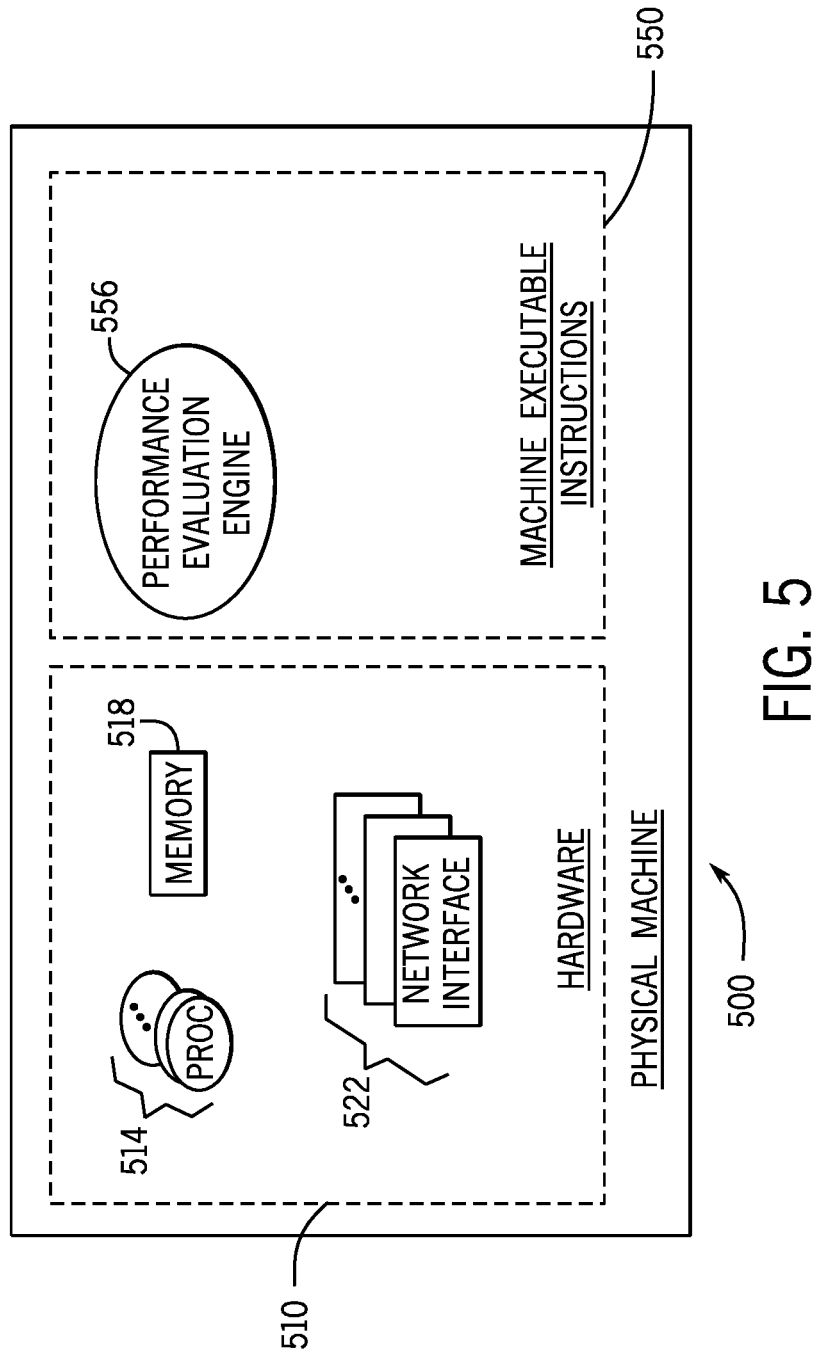
FIG. 5 is a schematic diagram of a physical machine according to an example implementation.

Referring to FIG. 5, in accordance with example implementations, the performance evaluation engine 150 (FIG. 1) may include one or multiple actual, physical machines 500. The physical machine 500 is made up of actual hardware 510 and machine executable instructions 550, or "software." In accordance with some implementations, the hardware 510 may include one or multiple processors 514 (e.g., one or multiple Central Processing Units (CPUs), one or multiple CPU cores, and so forth). The hardware 510 may include a memory 518, which may, for example, contain or store data representing one or more of the following: identified behavior anomalies; security events; security event logs; threat intelligence; anomaly detection characterization; feature sets to be examined; security threat contexts and so forth. Moreover, in accordance with example implementations, the memory 518 may contain instructions that, when executed by the processor(s) 514, cause the processor(s) 514 to perform one or more of the techniques that are described herein.

In general, the memory 518 may be a non-transitory memory that may be formed from, as examples, semiconductor storage devices, memristors, magnetic storage devices, phase change memory devices, a combination of one or more of these storage technologies, and so forth, depending on the particular implementation.

In accordance with some implementations, the hardware 510 of the physical machine 500 may include various other components, such as, for example, one or multiple network interfaces 522, input/output (I/O) devices, a display and so forth.

In accordance with some implementations, the machine executable instructions 550 may include, for example, instructions 556 that when executed by the processor(s) 514, cause the processor(s) 514 to form the performance evaluation engine 150 (FIG. 1); instructions that when executed by the processor(s) 514 cause the processor(s) 514 to form the anomaly detection engine 122 (FIG. 1); and so forth.

In accordance with further example implementations, all or part of the above-described processor-based architecture may be replaced by dedicated, hardware circuitry or by one or multiple Application Specific Integrated Circuits (ASICs). For example, in accordance with some implementations, the performance evaluation engine 150 may be formed from one or multiple ASICs. Thus, many implementations are contemplated, which are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:
1. A method comprising:
in a computer, receiving data provided by an anomaly detection engine identifying a plurality of behavior anomalies exhibited by entities associated with a computer system, wherein receiving the data comprises receiving first data representing first observables associated with a given behavior anomaly of the plurality of behavior anomalies;
in the computer, associating the plurality of behavior anomalies with contexts based at least in part on a threat intelligence to provide enriched anomalies, wherein the threat intelligence associates the contexts with indicators of potential breach, and associating the plurality of behavior anomalies with the contexts comprises supplementing the first data to provide second data representing the first observables and a second observable obtained from the threat intelligence; and
in the computer, characterizing a performance of the anomaly detection engine, wherein the characterizing comprises applying machine learning to features of the enriched anomalies to classify the plurality of behavior anomalies, and applying the machine learning comprises applying the machine learning to features of the first observables and the second observable to classify the given behavior anomaly as being a false positive or a false negative.
2. The method of claim 1, wherein applying machine learning further comprises applying clustering to identify a plurality of feature combinations shared by subsets of the plurality of behavior anomalies.

3. The method of claim 2, further comprising applying the clustering to identify a set of most common feature combinations of the plurality of feature combinations.

4. The method of claim 1, further comprising:
evaluating an effectiveness of a behavior anomaly identification of the anomaly detection engine based at least in part on the classification of the given behavior anomaly.

5. The method of claim 4, wherein evaluating the effectiveness further comprises determining true positive rates and false negative rates of the anomaly detection engine in detecting an associated security threat.

6. The method of claim 1, wherein characterizing further comprises averaging at least one of the following: security event log data; event data corresponding to different time windows; event data collected from different organizations; or a threat intelligence associated with multiple threat intelligence sources.

7. The method of claim 1, wherein applying the machine learning to classify the given behavior anomaly further comprises classifying the given behavior anomaly as belonging to a category of malware detection.

8. The method of claim 1, wherein the first observables comprise an action taken by a given entity of the entities and a response received by the given entity.

9. The method of claim 1, wherein the first observables comprise an Internet Protocol (IP) address or a domain accessed by a given entity of the entities, and the second observable comprises a recognized malicious name or attack associated with the IP address, or the domain.

10. An apparatus comprising:
a processor; and
a memory storing instructions that, when executed by the processor, cause the processor to:
identify security incidents based at least in part on first data representing security event logs and second data representing a threat intelligence, the threat intelligence representing a plurality of indicators of potential breach and an associated first plurality of contexts for the plurality of indicators;
receive third data provided by an anomaly detection engine identifying a plurality of behavior anomalies exhibited by entities associated with a computer system, wherein the third data represents observables associated with a given behavior anomaly of the plurality of behavior anomalies;
associate the plurality of behavior anomalies with a second plurality of contexts based at least in part on the threat intelligence to provide a plurality of enriched anomalies, wherein associating the plurality of behavior anomalies with the second plurality of contexts comprises providing fourth data representing the observables associated with the given behavior anomaly and a given indicator of the plurality of indicators; and
characterize a performance of the anomaly detection engine, wherein the characterization comprises applying machine learning to features of the security incidents and the given indicator to classify the given behavior anomaly as being a false positive or a false negative.

11. The apparatus of claim 10, wherein the characterization represents an effectiveness of a behavior anomaly identification of the anomaly detection engine.

12. The apparatus of claim 10, wherein the processor identifies the security incidents based at least in part on a predetermined set of features associated with a security threat.

13. The apparatus of claim 12, wherein the characterization comprises a measure of a failure of the anomaly detection engine to identify anomalies associated with the security threat.

14. The apparatus of claim 10, wherein the characterization represents a quality of the threat intelligence.

15. The apparatus of claim 10, wherein the instructions, when executed by the processor, further cause the processor to apply the machine learning to classify the given behavior anomaly as belonging to a category of malware detection.

16. An article comprising a non-transitory computer readable storage medium to store instructions, that when executed by a computer, cause the computer to:
receive first data representing a threat intelligence, the threat intelligence associating security threat contexts with first observables;
receive second data from an anomaly detection engine, wherein the second data represents behavior anomalies and associated second observables, and the anomaly detection engine processes security event logs to identify the behavior anomalies;
associate the second observables with the security threat contexts; and
characterize an analysis of the anomaly detection engine based at least in part on the associations between the second observables and the security threat contexts, wherein the characterization comprises correlating the behavior anomalies with the security event logs to identify false negatives.

17. The article of claim 16, wherein the instructions, when executed by the computer, further cause the computer to classify the behavior anomalies according to security threat categories and provide an assessment of true positives for the security threat categories.

18. The article of claim 16, wherein the instructions, when executed by the computer, further cause the computer to associate the false negatives with at least one security threat category.

19. The article of claim 16, wherein:
the first observables comprise an Internet Protocol (IP) address or a domain accessed by a given entity of the entities; and
the second observables comprise a recognized malicious name or an attack associated with the IP address, or the domain.

20. The article of claim 16, wherein the security threat categories comprise a category of malware detection.

* * * * *